US008797929B2

(12) United States Patent
Yamamoto

(10) Patent No.: US 8,797,929 B2
(45) Date of Patent: Aug. 5, 2014

(54) COMMUNICATION APPARATUS AND CONTROL METHOD THEREOF

(75) Inventor: Tetsuya Yamamoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 860 days.

(21) Appl. No.: 12/141,745

(22) Filed: Jun. 18, 2008

(65) Prior Publication Data

US 2008/0316949 A1 Dec. 25, 2008

(30) Foreign Application Priority Data

Jun. 22, 2007 (JP) .................................. 2007-165225

(51) Int. Cl.
*G08C 17/00* (2006.01)
*H04W 4/00* (2009.01)

(52) U.S. Cl.
USPC .......................................... 370/311; 370/334

(58) Field of Classification Search
USPC ........................................................ 370/311
See application file for complete search history.

(56) References Cited

U.S. PATENT DOCUMENTS

| 5,999,830 | A * | 12/1999 | Taniguchi et al. ............. 455/574 |
| 6,437,699 | B1 * | 8/2002 | Hayakawa ................ 340/636.13 |
| 6,463,050 | B1 * | 10/2002 | Nagashima ..................... 370/347 |
| 7,020,110 | B2 * | 3/2006 | Walton et al. .................. 370/334 |
| 7,756,230 | B2 * | 7/2010 | Raphaeli et al. ............... 375/354 |
| 8,483,092 | B2 * | 7/2013 | de Sousa ........................ 370/255 |
| 8,515,435 | B2 * | 8/2013 | Krasny et al. .................. 455/450 |
| 8,675,611 | B2 * | 3/2014 | Ball et al. ....................... 370/334 |
| 2003/0236069 | A1 * | 12/2003 | Sakata et al. .................. 455/11.1 |
| 2004/0147289 | A1 | 7/2004 | Paljug et al. |
| 2005/0042999 | A1 | 2/2005 | Rappaport |
| 2005/0147177 | A1 * | 7/2005 | Seo et al. ........................ 375/267 |
| 2005/0190849 | A1 * | 9/2005 | McNamara ..................... 375/267 |
| 2006/0084461 | A1 * | 4/2006 | Sekiya et al. .................. 455/522 |
| 2006/0120313 | A1 * | 6/2006 | Moritomo et al. ............. 370/311 |
| 2006/0205356 | A1 * | 9/2006 | Laroia et al. ................... 455/66.1 |
| 2006/0270343 | A1 * | 11/2006 | Cha et al. ......................... 455/25 |
| 2007/0026865 | A1 * | 2/2007 | Yano et al. ...................... 455/438 |
| 2007/0263564 | A1 * | 11/2007 | Hansen et al. ................. 370/328 |
| 2010/0056217 | A1 * | 3/2010 | Montojo et al. ............ 455/562.1 |

FOREIGN PATENT DOCUMENTS

| EP | 0582323 A1 | 2/1994 |
| JP | 2003-032179 A | 1/2003 |
| JP | 2006-140853 | 6/2006 |
| JP | 2007-006258 | 1/2007 |
| WO | 2006-110737 A | 10/2006 |
| WO | 2006-137282 A | 12/2006 |

OTHER PUBLICATIONS

European Search Report issued on Jun. 6, 2012, that issued in the corresponding European Patent Application No. 08010371.6.

* cited by examiner

*Primary Examiner* — Guang Li

(74) *Attorney, Agent, or Firm* — Cowan, Liebowitz & Latman, P.C.

(57) ABSTRACT

A discrimination unit of a communication apparatus discriminates information on devices configuring a network, and a selection unit of the communication apparatus selects whether or not to execute a process of selecting an antenna to be used in communication, based on the information discriminated by the discrimination unit. The information discriminated by the discrimination unit in the present circumstance is type, the function, the type of power supply, or the remaining battery life, of other communication apparatuses.

15 Claims, 13 Drawing Sheets

F I G. 1
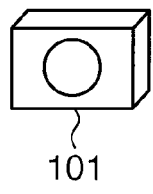
101
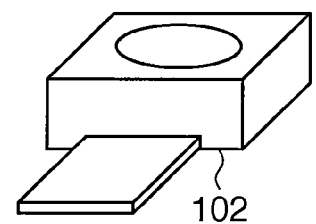
102
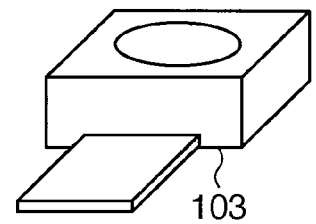
103

F I G. 10
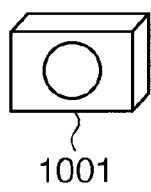
1001
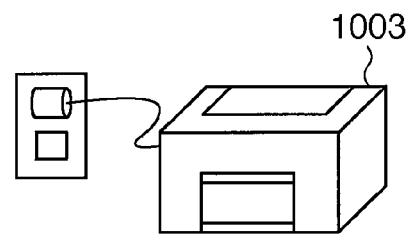
1003
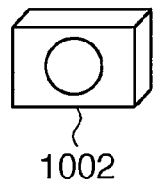
1002

COMMUNICATION APPARATUS AND CONTROL METHOD THEREOF

BACKGROUND OF THE INVENTION

1. Field of the Invention

The present invention relates to a communication apparatus that selects an antenna, a method of controlling the communication apparatus that selects the antenna, and a program thereof.

2. Description of the Related Art

Two types of network are known to be a wireless LAN. One type is an infrastructure network, wherein communication is made via a parent station that is known as an access point. Another type is an ad hoc network, wherein the communication is made between a child station and another child station, without being routed via the access point.

Using Multiple Input Multiple Output (MIMO), with the IEEE 802.11n specification is also being reviewed. MIMO is a wireless communication technology that combines a plurality of antennae, thus enlarging the bandwidth of the transmission and reception of data. When using the plurality of antennae to perform the communication via the MIMO technology, an assessment is performed of the propagation path of each respective antenna, whereupon an antenna with good characteristics is selected for the communication. A review is thus being conducted into methods of improving the quality of the transmission.

Conventionally, a method of selecting an antenna, or a combination of antennae, with good characteristics has been proposed as a method of improving the quality of the wireless transmission, such as the following:

Cited Reference 1: Japanese Patent Laid-Open No. 2007-006258
Cited Reference 2: Japanese Patent Laid-Open No. 2006-140853

It would be permissible for each respective child station of an infrastructure network to perform the selection of the antenna between itself and the parent station in order to communicate via the parent station, even when communicating between the child stations. There is no parent station with an ad hoc network, however. As a consequence, if an ad hoc network contains three or more child stations, antenna selection is complicated by the fact that a given transmitter may have more than one possible unit with which to communicate. As an instance of such a complication thereof, additional time is consumed before a given communication commences with the performance of the selection of the antenna with each and every communication, which interferes with ease of use. Selecting and storing the antenna to be used on a per communication unit basis prior to use is not guaranteed to solve the problem either, as there is no guarantee that the quality of the transmission will necessarily improve with the antenna that is thus preselected.

Another problem is that of devices, such as printers, that do not have a need for communication with one another. Performing antenna selection between the devices is a waste of time and electricity that is expended in the process of performing the selection thereof.

SUMMARY OF THE INVENTION

It is an objective of the present invention to offer a technology that will be preferable to employ in the execution of the antenna selection process.

According to an embodiment of the present invention, there is provided a communication apparatus, comprising: a discrimination unit configured to discriminate information on devices configuring a network; and a selection unit configured to select whether or not to execute a process of selecting an antenna to be used in communication, based on the information discriminated by the discrimination unit.

According to another embodiment of the present invention, there is provided a control method of a communication apparatus, comprising: discriminating information on devices configuring a network; and selecting whether or not to execute a process of selecting an antenna to be used in communication, based on the information discriminated in the discriminating step.

Further features of the present invention will become apparent from the following description of exemplary embodiments (with reference to the attached drawings).

BRIEF DESCRIPTION OF THE DRAWINGS

FIG. 1 is a diagram of a configuration of a communication apparatus system that includes a communication apparatus according to a first embodiment.

FIG. 10 is a diagram of a configuration of a communication apparatus system that includes a communication apparatus according to a fourth embodiment.

DESCRIPTION OF THE EMBODIMENTS

First Embodiment

Figure 2:
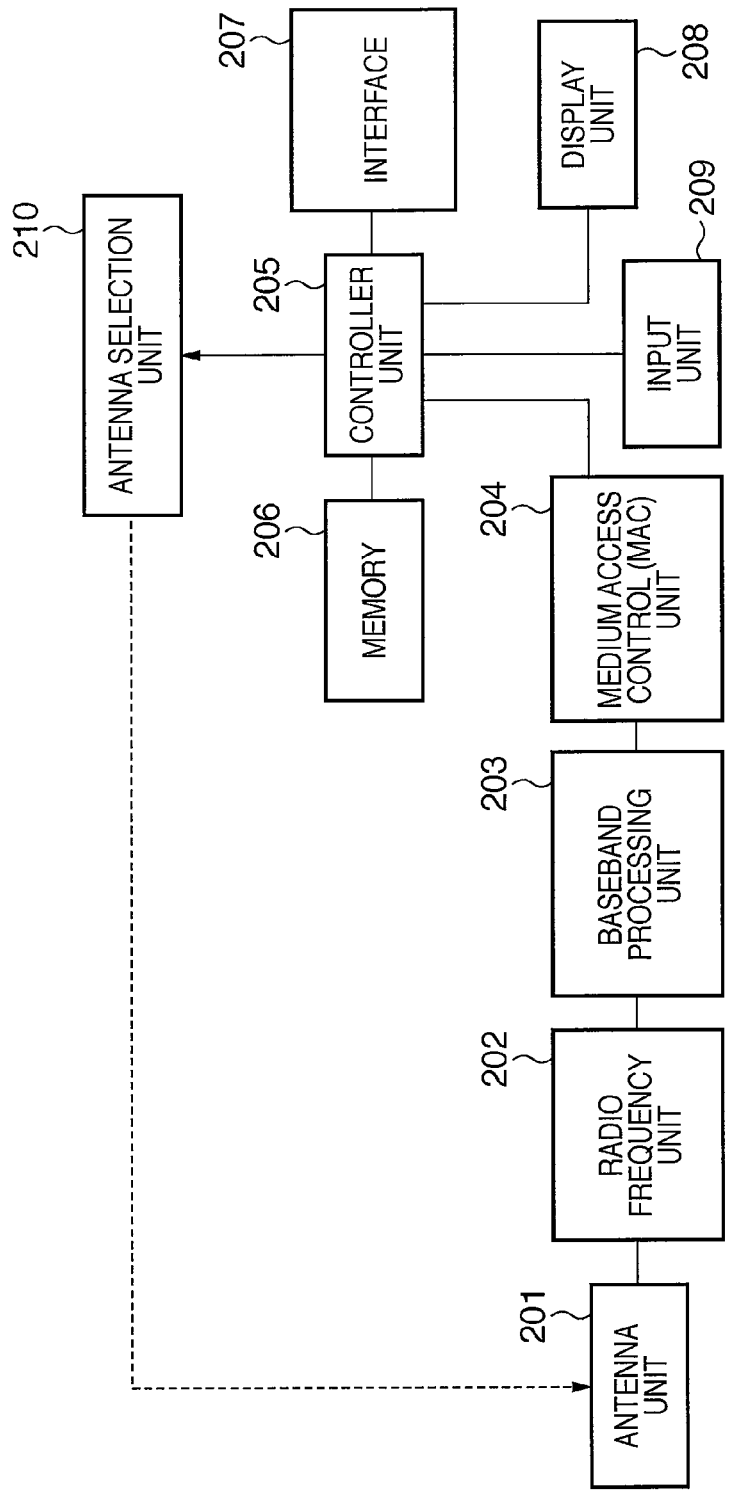
FIG. 2 is a function block diagram that associates wireless communication and a wireless communication setting within the communication apparatus according to the first embodiment.

Following is a description of a configuration of a communication system that includes a communication apparatus according to a first embodiment of the present invention, with reference to FIG. 1.

The communication system is a wireless LAN system in an ad hoc mode. Reference numerals 101, 102, and 103 in FIG.

1 are communication apparatuses, respectively. In the present circumstance, the communication apparatus 101 is a digital camera, i.e., an image input apparatus, and the communication apparatuses 102 and 103 are printers, i.e., image output apparatuses, respectively. The communication apparatuses 101, 102, and 103 each comprise a wireless communication function, and are within an environment wherein the communication apparatuses 101, 102, and 103 are respectively capable of bidirectional wireless communication.

FIG. 2 is a function block diagram that describes a function configuration that implements a function that associates wireless communication and a wireless communication setting within the communication apparatuses 101, 102, and 103, according to the first embodiment.

When receiving a wireless data, a wireless signal is ingathered by an antenna unit 201, and the wireless signal thus ingathered is transformed into a baseband signal by a radio frequency unit 202. The resulting baseband signal is further transformed into a digital signal with a baseband processing unit 203. The resulting digital signal is further transformed into a prescribed data format with a media access control (MAC) unit 204, and sent thereby to a controller unit 205. It is to be understood that, when the wireless data is being transmitted, the data flows in a direction opposite to a direction that the data flows when being received.

The controller unit 205 either stores the data that is received from the media access control (MAC) unit 204 in a memory 206, or sends the data thus received, via an interface 207, to an external device, or an external unit, that is connected to the interface 207. The controller unit 205 also receives the data from the external device or the external unit that is connected to the interface 207, and either stores the data thus received in the memory 206, or sends the data thus received to the media access control (MAC) unit 204. In addition, the controller unit 205 either outputs the data that is stored in the memory 206 to the media access control (MAC) unit 204, or transmits the data stored therein to the external device or the external unit via the interface 207. In addition, the controller unit 205 executes each respective type of data process, and outputs the result thereof to be displayed upon a display unit 208. An input unit 209, which contains such as a keyboard and a mouse, is used input such as a range of settings or commands that are directed thereby by a user. An antenna selection unit 210 selects an antenna according to a direction from the controller unit 205. Also stored in the memory 206 is a program whereby the controller unit 205 performs the various respective controls. Put another way, the controller unit 205 loads the program that is stored in the memory 206, and executes the various respective controls that will be described in detail hereinafter.

Figure 3:
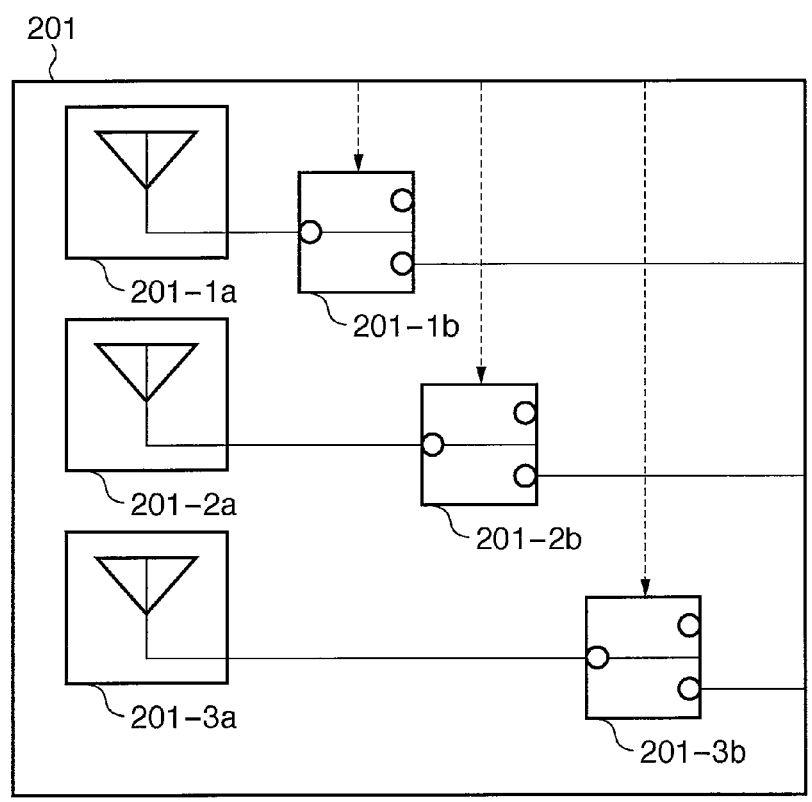
FIG. 3 is a diagram of a configuration of an antenna unit according to the first embodiment.

A configuration of the antenna unit 201 is depicted in FIG. 3.

Reference numerals 201-1a, 201-2a, and 201-3a are antennae.

Reference numerals 201-1b, 201-2b, and 201-3b are antenna switches, which either connect each respective antenna to, or disconnect each antenna from, the radiofrequency unit 202, according to the control by the antenna selection unit 210. It is possible to perform the connection or disconnection thereof independently with regard for each respective antenna. It is possible to place all of the antennae into a connected state, as well as to place only one arbitrarily determined antenna into the connected state.

The communication system that employs the communication apparatuses 101, 102, and 103 according to the first embodiment operates as follows:

The operation begins when the user sets an operating mode for the communication apparatus 101, i.e., the digital camera (or the image input apparatus), as well as the communication apparatuses 102 and 103, i.e., the printers (or the image output apparatuses), to be the ad hoc mode, i.e., the mode for communication between terminals, without being routed via the access point. The user then sets a Service Set ID, or SSID, which is a network identifier tag, together with a security setting, to a predetermined value. Doing so creates a state wherein ad hoc communication is possible.

Thereafter, the communication apparatuses 101, 102, and 103 inform one another of their respective device identifier information, in accordance with the control of the controller unit 205. Specifically, the communication apparatuses 101, 102, and 103 inform one another of their respective device identifier information approximately every 100 milliseconds, in the form of a broadcast data. The device identifier information that the communication apparatus 101, i.e., the image input apparatus, transmits includes an address, which is an identifying information that specifies the present hardware, and an information that denotes that the present hardware is the image input apparatus. Conversely, the device identifier information that the communication apparatuses 102 and 103, i.e., the image output apparatuses, transmit includes an address, which is an identifying information that specifies the present hardware, and an information that denotes that the present hardware is the image output apparatus.

Figure 4:
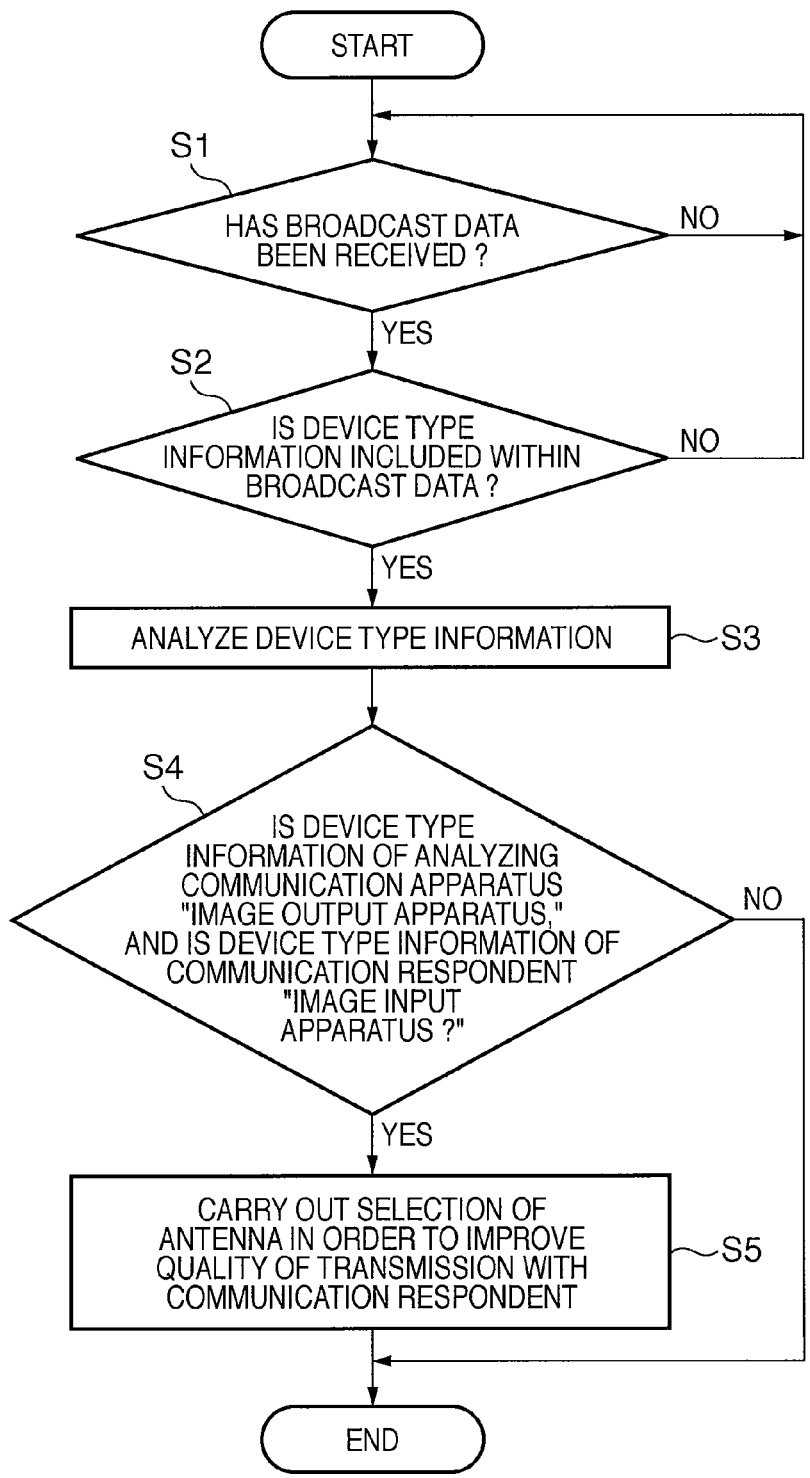
FIG. 4 is a flowchart that describes an operation of the communication apparatus according to the first embodiment.

FIG. 4 is an operation flowchart that the controller unit 205 of the communication apparatuses 101, 102, and 103 executes according to the program that is stored upon the memory 206.

In step S1 of FIG. 4, the controller unit 205 of the communication apparatuses 101, 102, and 103 receives the broadcast data. In step S2, a determination is made as to whether or not the device identifier information is included within the data thus received, and if the device identifier information is not included therein, the process returns to step S1. If the device identifier information is included therein, the process proceeds to step S3, wherein the device identifier information that is included therein is analyzed.

The controller unit 205 of the communication apparatus 101, i.e., the image input apparatus, understands thereby that the communication apparatuses 102 and 103, which are the communication respondents of the communication apparatus 101, i.e., the image input apparatus, are the image output apparatuses. In such a circumstance, the condition in step S4 is not satisfied, and the process terminates as a result. Put another way, the controller unit 205 of the communication apparatus 101 determines in step S4 whether or not its own device identifier information is the image output apparatus. The controller unit 205 of the communication apparatus 101 further determines in step S4 whether or not the device identifier information of the device that transmits the broadcast data that it receives is the image input apparatus. When the controller unit 205 of the communication apparatus 101 performs the present determination, i.e., in step S4, the process terminates, because it is itself the image input apparatus.

If, on the other hand, with the communication apparatuses 102 and 103, which are the image output apparatuses, the communication apparatus 101 is the communication respondent thereof, the determination in step S4 is satisfied, i.e., "YES," and the process proceeds to step S5. Put another way, the controller unit 205 of the communication apparatuses 102 and 103 determines in step S4 that its own device identifier information is the image output apparatus. The controller unit 205 of the communication apparatuses 102 and 103 further determines in step S4 that the device that transmits the broadcast data that it receives is the image input apparatus, and thus, the process proceeds to step S5. In step S5, a process of selecting the antenna is carried out, in order to improve the quality of transmission between the communication apparatuses 102 and 103 on the one hand, and the communication apparatus 101 that is the communication respondent thereof on the other. Put another way, in step S4 and step S5, the process of selecting the antenna is carried out, in accordance with the device identifier information of the communicating communication apparatuses, i.e., the image output apparatuses, and the device identifier information of the communication respondent thereof, i.e., the image output apparatus.

A review is being conducted with regard to using Multiple Input Multiple Output (MIMO), with a wireless LAN that is compliant with the IEEE 802.11n specification. MIMO is a wireless communication technology that combines a plurality of antennae, thus enlarging the bandwidth of the transmission and reception of data. The MIMO technology implements broadband communication by transmitting different data from a plurality of antennae, and assembles a composite of the data at the receiver thereof. In addition, when using the plurality of antennae to perform the communication via the MIMO technology, an assessment is performed of the propagation path of each respective antenna, whereupon an antenna with good characteristics is selected, and the antenna thus selected is used to perform the selection of the antenna that performs the communication. The antenna selection process is performed in step S5. As a result of the selection of the antenna thereof, as an instance, places the reference numerals 201-1b and 201-2b in a connected state, and the reference numeral 201-3b in a disconnected state, within the communication apparatus 102. Thus, the two antennae 201-1a and 201-2a, which have high quality of transmission between the communication apparatus 102 and the communication apparatus 101, are selected and used in the communication therebetween. In addition, the reference numeral 201-3b is set in a disconnected state, and the reference numerals 201-1b and 201-2b in a connected state, within the communication apparatus 103, and the two antennae 201-2a and 201-3a, which have high quality of transmission between the communication apparatus 103 and the communication apparatus 101, are selected and used in the communication therebetween.

Thus, it is possible to improve the quality of transmission between the communication apparatuses 102 and 103, which are the image output apparatuses, on the one hand, and the communication apparatus 101 that is the image input apparatus on the other. In addition, it is not necessary for wireless communication to take place between the respective image output apparatuses, i.e., whereas wireless communication takes place therebetween, the communication thereof has a low degree of priority. Thus, it is possible to prevent a deterioration in the quality of transmission between the image output apparatuses and the image input apparatus, by performing the selection of the antenna with the image output apparatuses.

It is to be understood that, with respect to the preceding description, the process returns to step S1 when it is determined in step S2 that the data that is received therein does not include the device identifier information. It would be permissible, however, for the process to terminate instead when it is determined that the data that is received therein does not include the device identifier information, as the identity of the communication respondent would be unclear as a result.

In addition, when the communication apparatus 101 executes the operation that is depicted in FIG. 4, the process invariably terminates as a result of the determination that is performed in step S4. Accordingly, it is sufficient for the process that is depicted in FIG. 4 to be performed only upon the image output apparatuses; it is not necessary to perform the process therein upon the image input apparatus. In addition, the device identifier information of the apparatus that performs the determination in step S4 is predetermined when the image output apparatuses perform the determination therein, and thus, it is invariably unnecessary to determine the device identifier information of the apparatus that performs the determination therein. In summary, when the image output apparatuses perform the determination in step S4, the determination is made as to whether or not the device identifier information of the communication respondent is the image input apparatus, and if it is determined that the device identifier information of the communication respondent is the image input apparatus, then it would be permissible for the process to proceed to step S5.

In addition, the determination in step S4 is an instance wherein a device of a first device identifier information performs the antenna selection when a device identifier information of a communication respondent is a second device identifier information. Accordingly, the device identifier information is not restricted to the image input apparatus and the image output apparatus.

Second Embodiment

Figure 5:
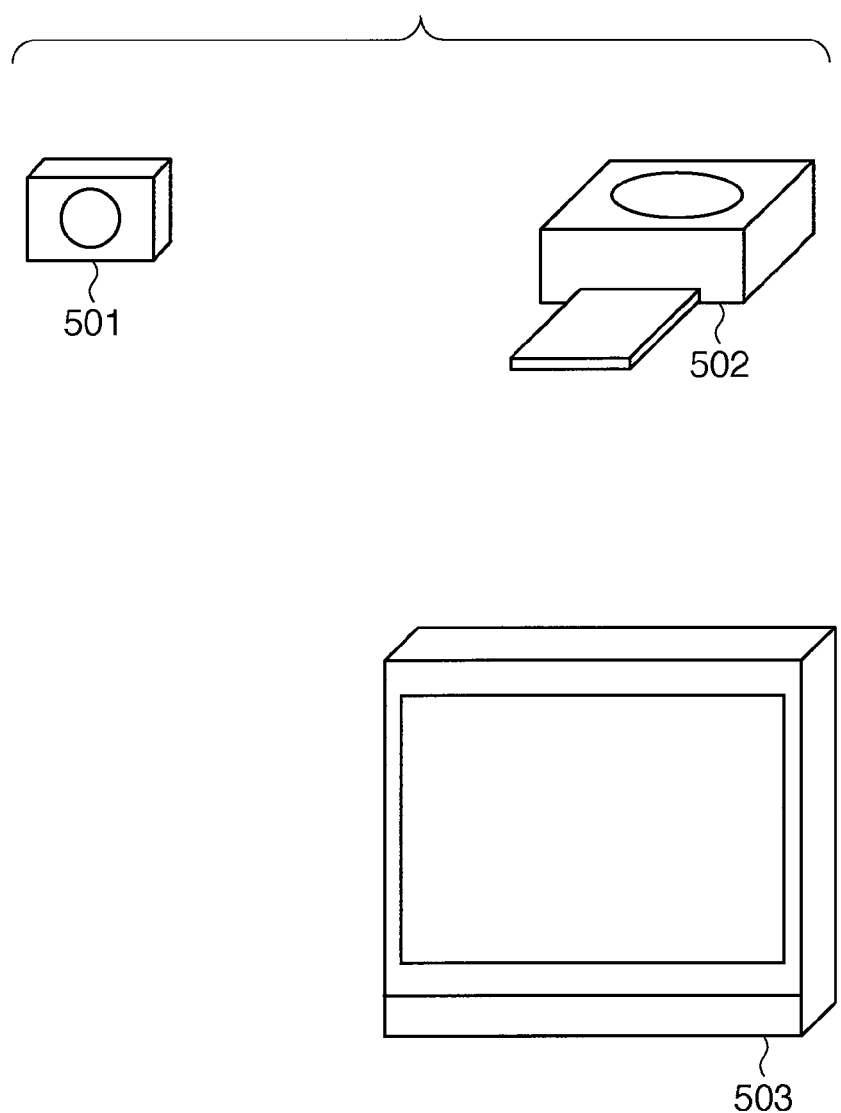
FIG. 5 is a diagram of a configuration of a communication apparatus system that includes a communication apparatus according to a second embodiment.

Following is a description of a configuration of a communication system that includes a communication apparatus according to a second embodiment of the present invention, with reference to FIG. 5.

The communication system is a wireless LAN system in an ad hoc mode. Reference numerals 501, 502, and 503 in FIG. 5 are communication apparatuses, respectively. In the present circumstance, the communication apparatus 501 is a digital camera, comprising an image input function, the communication apparatus 502 is a printer comprising an image output apparatus, and the communication apparatus 503 is a display, also comprising an image output apparatus. The communication apparatuses 501, 502, and 503 each comprise a wireless communication function, and are within an environment wherein the communication apparatuses 501, 502, and 503 are respectively capable of bidirectional wireless communication.

Figure 6:
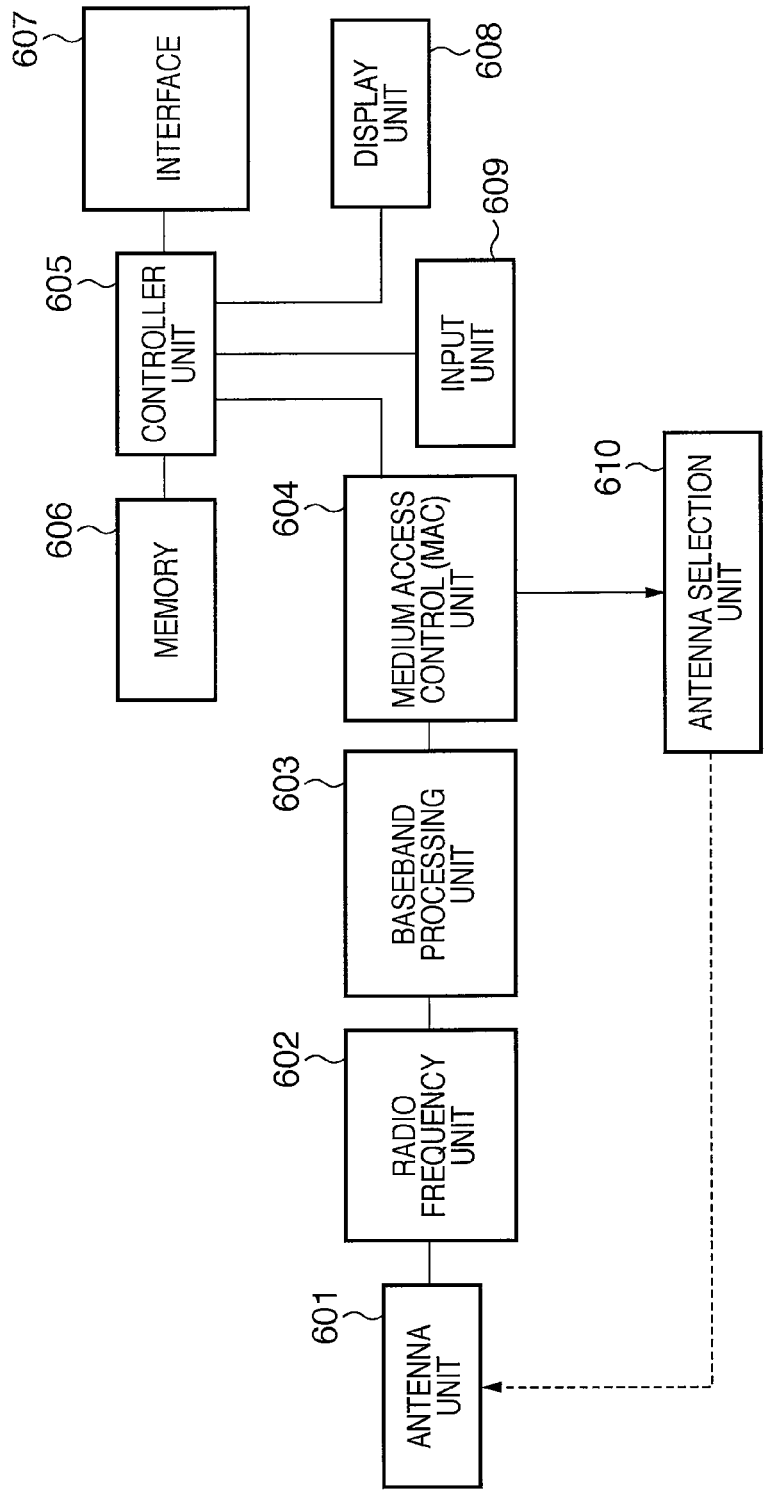
FIG. 6 is a function block diagram that associates wireless communication and a wireless communication setting within the communication apparatus according to the second embodiment.

FIG. 6 is a function block diagram that describes a function configuration that implements a function that associates wireless communication and a wireless communication setting within the communication apparatus 501, 502, and 503, according to the second embodiment.

When receiving a wireless data, a wireless signal is ingathered by an antenna unit 601, and the wireless signal thus ingathered is transformed into a baseband signal by a radio frequency unit 602. The resulting baseband signal is further transformed into a digital signal with a baseband processing unit 603. The resulting digital signal is further transformed into a prescribed data format with a media access control (MAC) unit 604, and sent thereby to a controller unit 605. It is to be understood that, when the wireless data is being transmitted, the data flows in a direction opposite to a direction that the data flows when being received.

The controller unit 605 either stores the data that is received from the media access control (MAC) unit 604 in a memory 606, or sends the data thus received, via an interface 607, to an external device, or an external unit, that is connected to the interface 607. The controller unit 605 also receives the data from the external device or the external unit that is connected to the interface 607, and either stores the data thus received in the memory 606, or sends the data thus received to the media access control (MAC) unit 604. In addition, the controller unit 605 either outputs the data that is stored in the memory 606 to the media access control (MAC) unit 604, or transmits the data stored therein to the external device or the external unit via the interface 607. In addition, the controller unit 605 executes each respective type of data process, and outputs the result thereof to be displayed upon a display unit 608. An input unit 609, which contains such as a keyboard and a mouse, is used input such as a range of settings or commands that are directed thereby by a user. An antenna selection unit 610 selects an antenna according to a direction from the media access control (MAC) unit 604. Also stored in the memory 606 is a program whereby the controller unit 605 performs the various respective controls. Put another way, the controller unit 605 loads the program that is stored in the memory 606, and executes the various respective controls that will be described in detail hereinafter.

The antenna unit 601 has a configuration that is similar to the configuration of the antenna unit 201 that is depicted in FIG. 3, and that is described according to the first embodiment.

The communication system that employs the communication apparatuses 501, 502, and 503 according to the second embodiment operates as follows:

The operation begins when the user sets an operating mode for the communication apparatus 501, 502, and 503, to be the ad hoc mode. The user then sets an SSID, together with a security setting, to a predetermined value. Doing so creates a state wherein ad hoc communication is possible.

Thereafter, the communication apparatuses 501, 502, and 503 inform one another of their respective device identifier information, in accordance with the control of the controller unit 605. Specifically, the communication apparatuses 501, 502, and 503 inform one another of their respective device identifier information approximately every 200 milliseconds, in the form of a broadcast data.

The device identifier information that the communication apparatus 501, i.e., the image input apparatus, transmits includes an address, which is an identifying information that specifies the present hardware, and an information that denotes that the present hardware is the image input apparatus. Conversely, the device identifier information that the communication apparatuses 502 and 503, i.e., the image output apparatuses, transmit includes an address, which is an identifying information that specifies the present hardware, and an information that denotes that the present hardware is the image output apparatus. In the event that each respective device comprises a plurality of functions, it would also be permissible for the device identifier information to include information that denotes the plurality of functions thereof.

Figure 7:
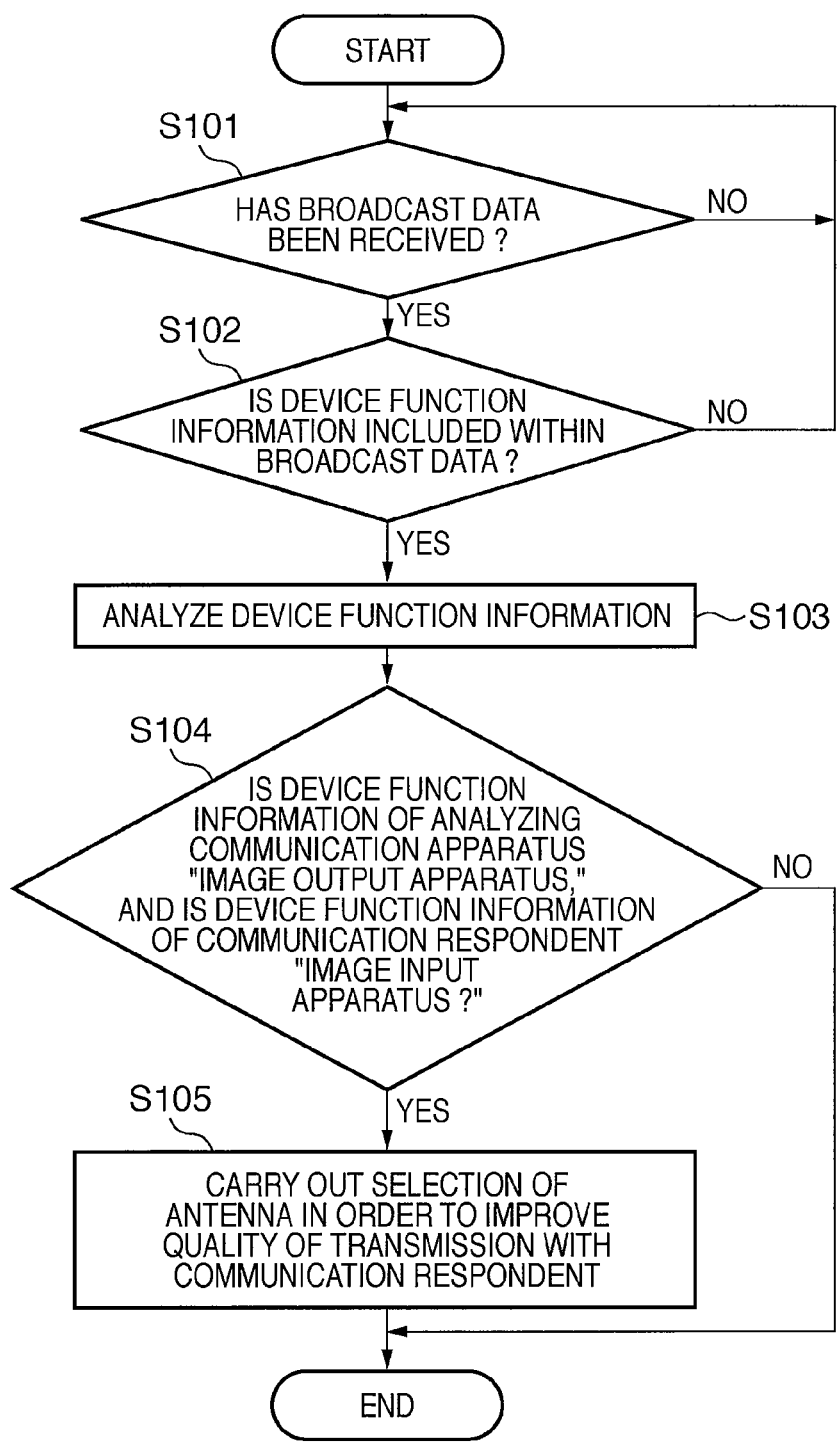
FIG. 7 is a flowchart that describes an operation of the communication apparatus according to the second embodiment.

FIG. 7 is a flowchart of an operation that the controller unit 605 of the communication apparatuses 501, 502, and 503 executes according to the program that is stored in the memory 606.

In step S101 of FIG. 7, the controller unit 605 of the communication apparatuses 501, 502, and 503 receives the broadcast data. In step S102, a determination is made as to whether or not the device identifier information is included within the data thus received, and if the device identifier information is not included therein, the process returns to step S101. If the device identifier information is included therein, the process proceeds to step S103, wherein the device identifier information that is included therein is analyzed.

The controller unit 605 of the communication apparatus 501, which comprises the image input apparatus, understands thereby that the communication apparatuses 502 and 503, which are the communication respondents of the communication apparatus 501, comprise the image output apparatuses. In such a circumstance, the condition in step S104 is not satisfied, and the process terminates as a result. Put another way, the controller unit 605 of the communication apparatus 501 determines in step S104 whether or not its own device comprises the image output apparatus. The controller unit 605 of the communication apparatus 501 further determines in step S104 whether or not the device that transmits the broadcast data that it receives comprises the image input apparatus. When the controller unit 605 of the communication apparatus 501 performs the present determination, i.e., in step S104, the process terminates, because it does not comprise the image input apparatus.

If, on the other hand, with the communication apparatuses 502 and 503, which comprise the image output apparatuses, the communication apparatus 501 is the communication respondent thereof, the determination in step S104 is satisfied, i.e., "YES," and the process proceeds to step S105. Put another way, the controller unit 605 of the communication apparatuses 502 and 503 determines in step S104 whether or not its own device comprises the image output apparatus. The controller unit 605 of the communication apparatuses 502 and 503 further determines in step S104 whether or not the device that transmits the broadcast data that it receives comprises the image input apparatus. Thereupon, the process proceeds to step S105, wherein a process of selecting the antenna is carried out, via the media access control (MAC) unit, in order to improve the quality of transmission between the communication apparatuses 502 and 503 on the one hand, and the communication apparatus 501 that is the communication respondent thereof on the other. The antenna selection process that takes place in step S105 is similar to the antenna selection process according to the first embodiment, and a description thereof will thus be omitted herein.

Thus, it is possible to improve the quality of transmission between the communication apparatuses 502 and 503, which are the image output apparatuses, on the one hand, and the image input apparatus, i.e., the communication apparatus, 501, which is the communication respondent, on the other. In addition, it is not necessary for wireless communication to take place between the respective image output apparatuses, i.e., whereas wireless communication takes place therebetween, the communication thereof has a low degree of priority. Thus, it is possible to prevent deterioration in the quality of transmission between the image output apparatuses and the image input apparatus, by performing the selection of the antenna with the image output apparatuses.

It is to be understood that, with respect to the preceding description, the process returns to step S101 when it is determined in step S102 that the data that is received therein does not include the device identifier information. It would be permissible, however, for the process to terminate instead when it is determined that the data that is received therein does not include the device identifier information, as the identity of the communication respondent would be unclear as a result.

In addition, when the communication apparatus 501 executes the operation that is depicted in FIG. 7, the process invariably terminates as a result of the determination that is performed in step S104. Accordingly, it is sufficient for the process that is depicted in FIG. 7 to be performed only upon the image output apparatuses; it is not necessary to perform the process therein upon the image input apparatus. In addition, the device function of the devices that performs the determination in step S104 is predetermined when the image output apparatuses perform the determination therein, and thus, it is invariably unnecessary to determine the device function of the device that performs the determination therein. In summary, when the image output apparatuses perform the determination in step S104, the determination is made as to whether or not the communication respondent comprises the device identifier information, and if it is determined that the communication respondent does comprise the image input function, then it would be permissible for the process to proceed to step S105.

In addition, the determination in step S104 is an instance wherein a device that comprises a first function performs the antenna selection function when a communication respondent thereof comprises a second function. Accordingly, the device identifier information is not restricted to the image input apparatus and the image output apparatus.

Third Embodiment

Figure 8:
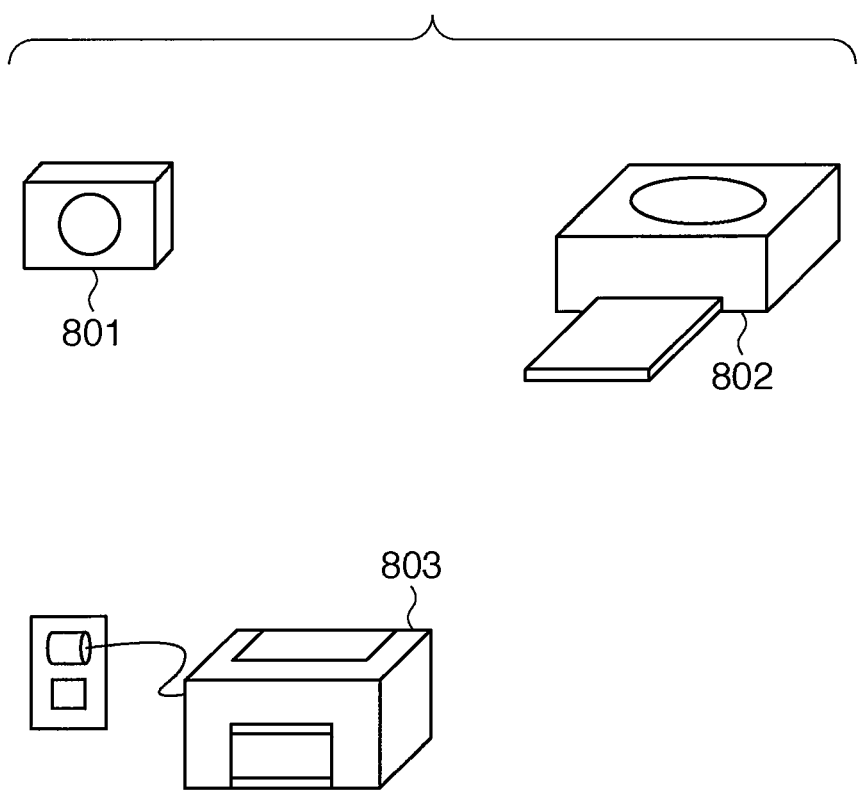
FIG. 8 is a diagram of a configuration of a communication apparatus system that includes a communication apparatus according to a third embodiment.

Following is a description of a configuration of a communication system that includes a communication apparatus according to a third embodiment of the present invention, with reference to FIG. 8.

The communication system is a wireless LAN system in an ad hoc mode. Reference numerals 801, 802, and 803 in FIG. 8 are communication apparatuses, respectively. In the present circumstance, the communication apparatuses 801 and 802 are battery powered apparatuses, and the communication apparatus 803 is an apparatus that is powered by a commercial power supply. The communication apparatuses 801, 802, and 803 each comprise a wireless communication function, and are within an environment wherein the communication apparatuses 801, 802, and 803 are respectively capable of bidirectional wireless communication.

The function block diagram that describes a function configuration that implements a function that associates wireless communication and a wireless communication setting within the communication apparatuses 801, 802, and 803 has a configuration that is similar to the configuration that is depicted in FIG. 2, and that is described according to the first embodiment.

The communication system that employs the communication apparatuses 801, 802, and 803 according to the third embodiment operates as follows:

The operation begins when the user sets an operating mode for the communication apparatus 801, 802, and 803, to be the ad hoc mode. The user then sets an SSID, together with a security setting, to a predetermined value. Doing so creates a state wherein ad hoc communication is possible.

Thereafter, the communication apparatuses 801, 802, and 803 inform one another of their respective power supply identifier information, in accordance with the control of the controller unit 205. Specifically, the communication apparatuses 801, 802, and 803 inform one another of their respective power supply identifier information approximately every 200 milliseconds, in the form of a broadcast data.

The power supply identifier information that the battery powered communication apparatus 801 and 802 transmits includes an address, which is an identifying information that specifies the present hardware, and an information that denotes that the present hardware is the battery powered communication apparatus. Conversely, the device identifier information that the communication apparatus 803, i.e., the apparatus that is powered by the commercial power supply, transmits includes an address, which is an identifying information that specifies the present hardware, and an information that denotes that the present hardware is the apparatus that is powered by the commercial power supply. In the event that each respective device comprises a plurality of functions, it would also be permissible for the device identifier information to include an information that denotes the plurality of functions thereof.

Figure 9:
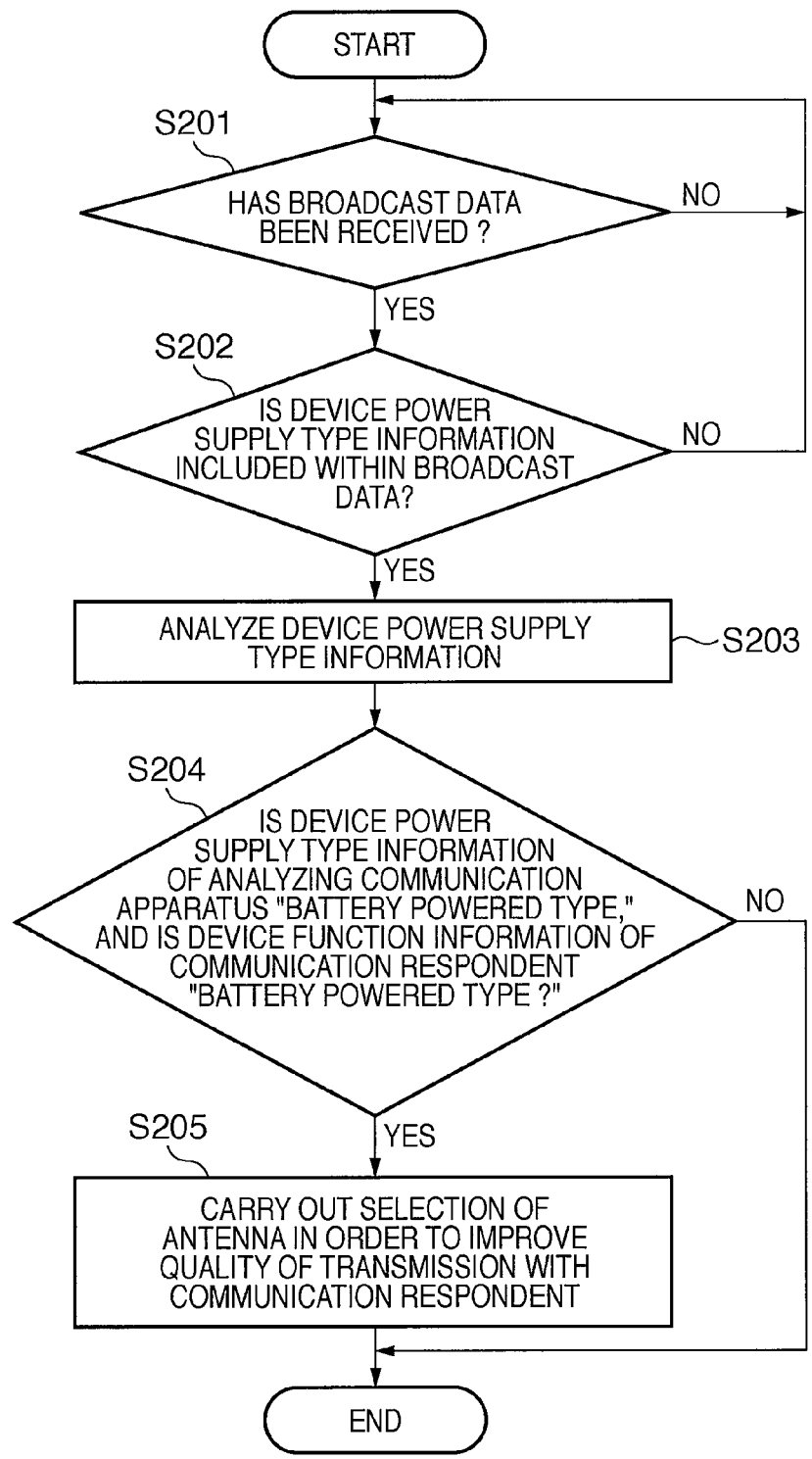
FIG. 9 is a flowchart that describes an operation of the communication apparatus according to the third embodiment.

FIG. 9 is a flowchart of an operation that the controller unit 205 of the communication apparatuses 801, 802, and 803 executes according to the program that is stored in the memory 206.

In step S201 of FIG. 9, the controller unit 205 of the respective communication apparatuses 801, 802, and 803 receives the broadcast data. In step S202, a determination is made as to whether or not the power supply identifier information is included within the data thus received, and if the power supply identifier information is not included therein, the process returns to step S201. If the power supply identifier information is included therein, the process proceeds to step S203, wherein the power supply identifier information that is included therein is analyzed. A determination is made thereby as to whether or not the power supply of the apparatus that is performing the determination is the battery powered type, and whether or not the power supply of the communication respondent is also the battery powered type.

The controller unit 205 of the communication apparatus 803 understands thereby that the communication apparatuses 801 and 802 are the battery powered apparatuses. Given, however, that the apparatus that is performing the determination thereof is itself the apparatus that is powered by the commercial power supply, the condition in step S204 is not satisfied, and the process terminates as a result.

If, on the other hand, if the communication apparatuses 801 and 802 are the communication respondents of one another, the determination in step S204 is satisfied, i.e., YES, and the process proceeds to step S205, wherein the controller unit 205 of the communication apparatuses 801 and 802 carries out a process of selecting the antenna, in order to improve the quality of bidirectional transmission between the respective communication apparatuses 801 and 802. The antenna selection process that takes place in step S205 is similar to the antenna selection process according to the first embodiment, and a description thereof will thus be omitted herein.

A communication error rate is thereby reduced, and the time that is required for the wireless communication shortened, with the communication apparatuses 801 and 802, and the battery life is improved as a consequence thereof.

In addition, when the communication apparatus 803 executes the operation that is depicted in FIG. 9, the process invariably terminates as a result of the determination that is performed in step S204. Accordingly, it is sufficient for the process that is depicted in FIG. 9 to be performed only upon the battery powered apparatuses; it is not necessary to perform the process therein upon the apparatus that is powered by the commercial power supply. In addition, the device identifier information of the device that performs the determination in step S204 is predetermined when the battery powered apparatuses perform the determination therein, and thus, it is invariably unnecessary to determine the device identifier information of the device that performs the determination therein. In summary, when the battery powered apparatuses perform the determination in step S204, the determination is made as to whether or not the device identifier information of the communication respondent is also the battery powered apparatus, and if it is determined that the communication respondent is also the battery powered apparatus, then it would be permissible for the process to proceed to step S205.

Whereas the preceding description employed the power supply information to determine the device that would perform the antenna selection, it would also be permissible instead to use the information as to whether the communication apparatus is the image input apparatus or the image output apparatus, such as is according to the first and the second embodiment, in addition to the power supply information, to determine the device that would perform the antenna selection. As an instance thereof, it would be permissible to have the battery powered device of the image input apparatus perform the antenna selection with the image output apparatus. In such a circumstance, it would be permissible to include a plurality of information within the device identifier information when transmitting the device identifier information.

In addition, the determination in step S204 is an instance wherein the device that is powered by the battery performs the antenna selection when the device identifier information of the communication respondent is specified device identifier information.

Fourth Embodiment

Following is a description of a configuration of a communication system that includes a communication apparatus according to a fourth embodiment of the present invention, with reference to FIG. 10.

The communication system is a wireless LAN system in an ad hoc mode. What is depicted in the present circumstance is an instance wherein reference numerals 1001, 1002, and 1003 in FIG. 10 are each communication apparatuses, respectively. In the present circumstance, the communication apparatuses 1001 and 1002 are battery powered image input apparatuses, and the communication apparatus 1003 is an image output apparatus that is powered by a commercial power supply. The communication apparatuses 1001, 1002, and 1003 are within an environment wherein the communication apparatuses 1001, 1002, and 1003 are respectively capable of bidirectional wireless communication.

The function block diagram that describes a function configuration that implements a function that associates wireless communication and a wireless communication setting within the communication apparatuses 1001, 1002, and 1003 has a configuration that is similar to the configuration that is depicted in FIG. 2, and that is described according to the first embodiment.

The communication system that employs the communication apparatuses 1001, 1002, and 1003 according to the fourth embodiment operates as follows:

The operation begins when the user sets an operating mode for the communication apparatuses 1001, 1002, and 1003, to be the ad hoc mode. The user then sets an SSID, together with a security setting, to a predetermined value. Doing so creates a state wherein ad hoc communication is possible.

Thereafter, the battery powered communication apparatuses 1001 and 1002 inform one another of their respective remaining battery life information, in accordance with the control of each respective controller unit 205. Specifically, the battery powered communication apparatuses 1001 and 1002 inform one another of their respective remaining battery life information approximately every 100 milliseconds, in the form of a broadcast data.

Figure 11:
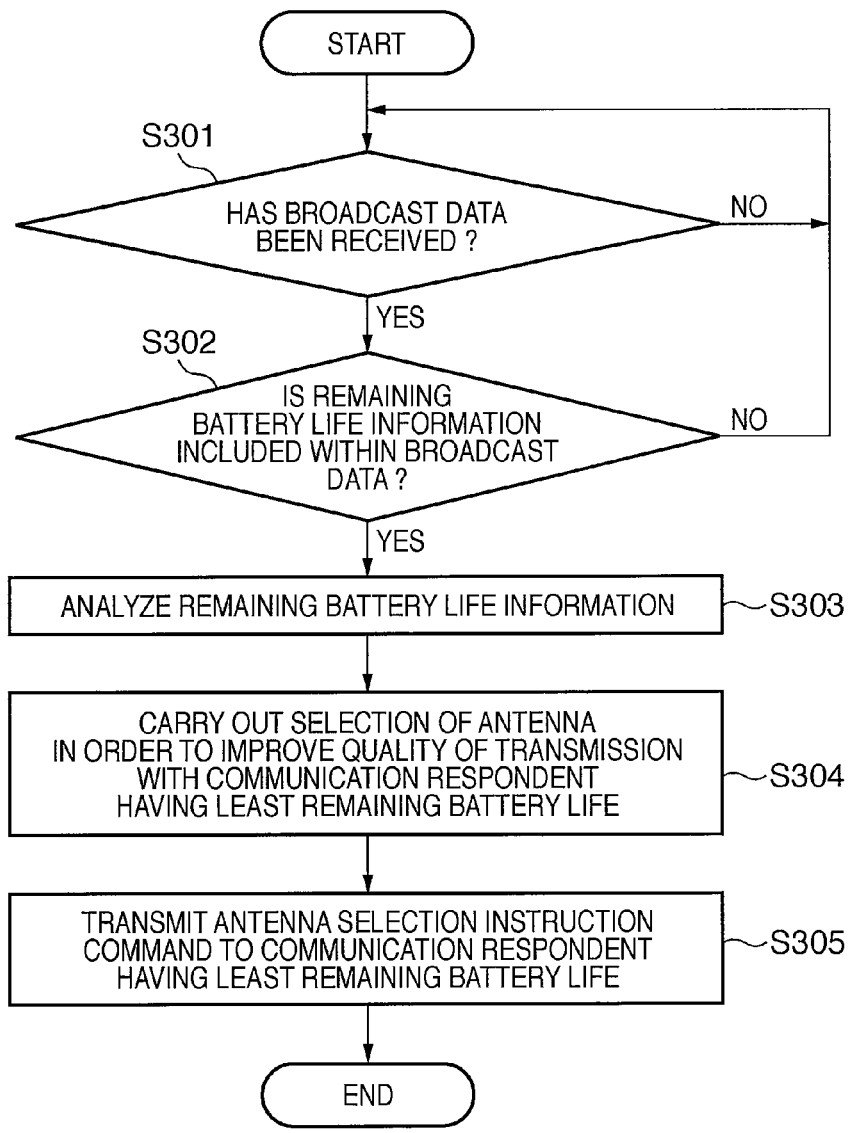
FIG. 11 is a flowchart that describes an operation of the communication apparatus according to the fourth embodiment.

FIG. 11 is a flowchart of an operation that the controller unit 205 of the communication apparatus 1003 executes according to the program that is stored in the memory 206.

In step S301 of FIG. 11, the controller unit 205 of the communication apparatus 1003 receives the broadcast data from the communication apparatuses 1001 and 1002. In step S302, a determination is made as to whether or not the remaining battery life information is included within the data thus received, and if the remaining battery life information is not included therein, the process returns to step S301. If the remaining battery life information is included therein, the process proceeds to step S303, wherein the remaining battery life information that is included therein is analyzed.

The controller unit 205 of the communication apparatus 1003 determines thereby which of the communication apparatuses 1001 and 1002 has the lower battery life. Put another way, the controller unit 205 of the communication apparatus 1003 determines the communication respondent with the least remaining battery life.

In the present example, the communication apparatus 1003 determines that the battery life of the communication apparatus 1001 is lower than the battery life of the communication apparatus 1002. As a consequence thereof, the selection of the antenna is carried out in step S304 in order to improve the quality of transmission between the communication apparatus 1001 and the communication apparatus 1003. In step S305, the communication apparatus 1003 further transmits a command that directs the selection of the antenna, to the communication apparatus 1001, which is the respondent that performs the antenna selection process.

Upon receipt of the command that directs the selection of the antenna, the communication apparatus 1001 carries out the selection of the antenna in order to improve the quality of transmission between the communication apparatus 1001 and the communication apparatus 1003. The antenna selection process according to the embodiment is similar to the antenna selection process according to the first embodiment, and a description thereof will thus be omitted herein.

A communication error rate is thereby reduced, and the time that is required for the wireless communication shortened, between the communication apparatuses 1001 and 1003, and the battery life of the communication apparatus 1001 is improved as a consequence thereof.

Whereas the remaining battery life is employed as the device information in the preceding description, it is to be understood that it would be permissible to employ a connection priority information as the device information instead.

It would also be permissible instead to use the information as to whether the communication apparatus is the image input apparatus or the image output apparatus, such as is according to the first and the second embodiment, in addition to the remaining battery life information, to determine the device that would perform the antenna selection. Doing so thereby allows the image output apparatus to perform the antenna selection with the image input apparatus that has the least remaining battery life. It is accordingly possible to prevent the antenna selection from being performed between the respective image output apparatuses as an instance.

Fifth Embodiment

Figure 12:
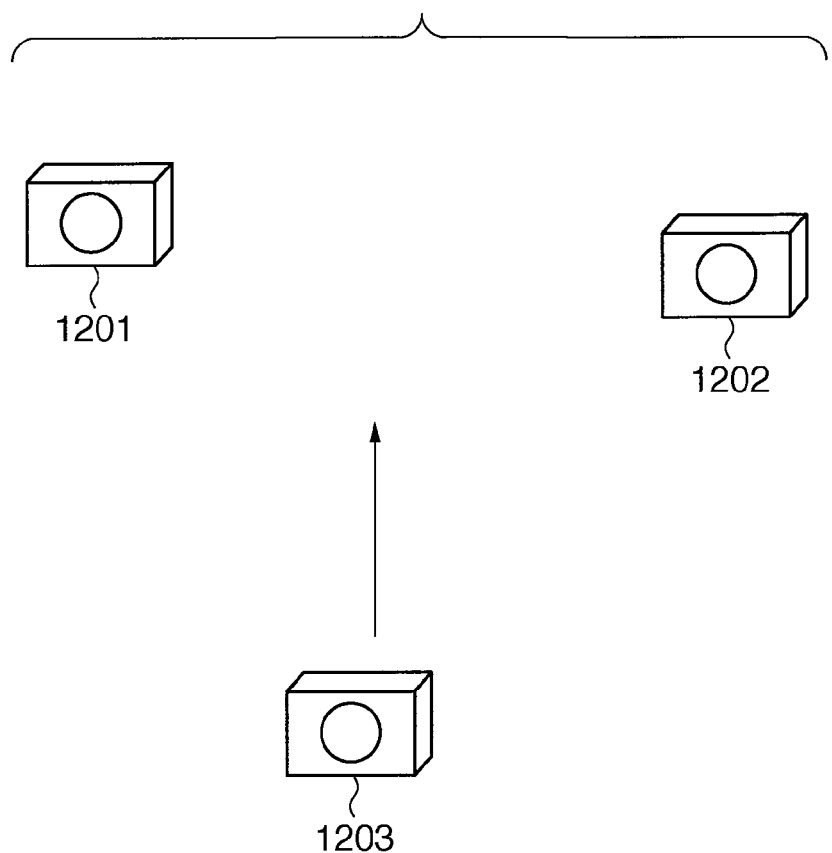
FIG. 12 is a diagram of a configuration of a communication apparatus system that includes a communication apparatus according to a fifth embodiment.

Following is a description of a configuration of a communication system that includes a communication apparatus according to a fifth embodiment of the present invention, with reference to FIG. 12.

The communication system is a wireless LAN system in an ad hoc mode. What is depicted in the present circumstance is an instance wherein reference numerals 1201, 1202, and 1203 in FIG. 12 are communication apparatuses, respectively, and which communicate with one another in a bidirectional wireless manner.

The function block diagram that describes a function configuration that implements a function that associates wireless communication and a wireless communication setting within the communication apparatuses 1201, 1202, and 1203 has a configuration that is similar to the configuration that is depicted in FIG. 2, and that is described according to the first embodiment.

The communication system that employs the communication apparatuses 1201, 1202, and 103 according to the fifth embodiment operates as follows:

The operation begins when the user sets an operating mode for the communication apparatuses 1201 and 1202 to be the ad hoc mode. The user then sets an SSID, together with a security setting, to a predetermined value. Doing so creates a state wherein ad hoc communication is possible.

Thereafter, the communication apparatuses 1201 and 1202 transmit a notification signal, in accordance with the control of either the media access control (MAC) unit 204 or the controller unit 205 of each communication apparatus. Specifically, the communication apparatuses 1201 and 1202 transmit the notification signal, which is called a "beacon," approximately every 100 milliseconds. It is to be understood that the beacon includes address information, which is an identifier tag that identifies the device.

Figure 13:
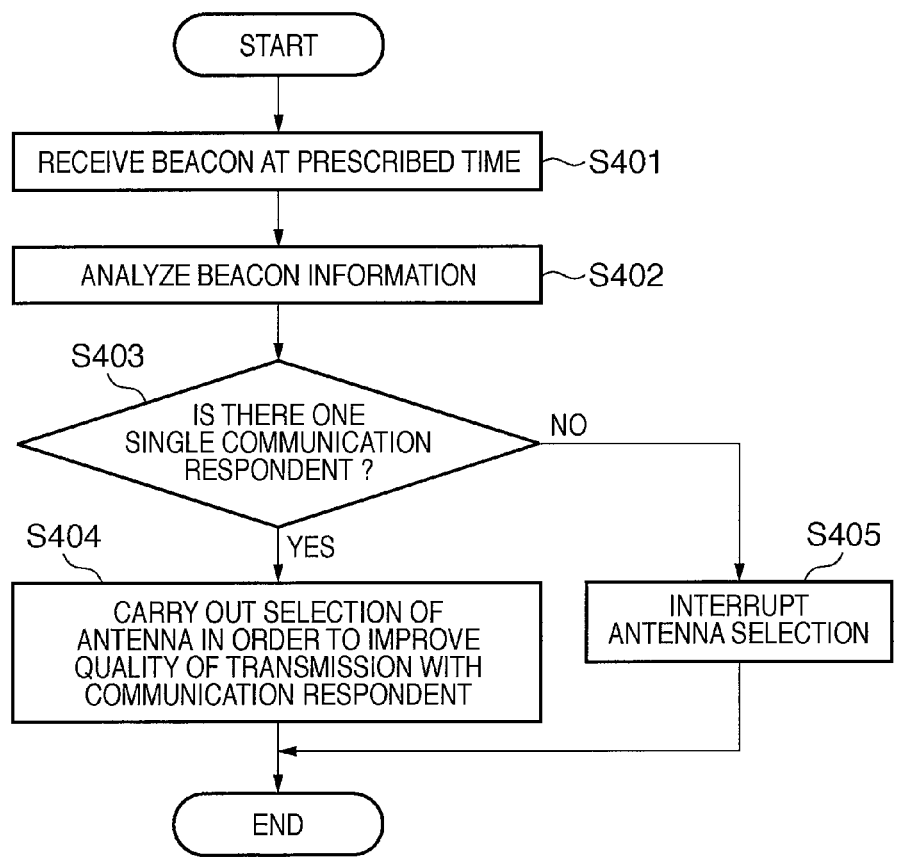
FIG. 13 is a flowchart that describes an operation of the communication apparatus according to the fifth embodiment.

FIG. 13 is a flowchart of an operation that the controller unit 205 of the communication apparatuses 1201 and 1202 executes according to the program that is stored in the memory 206.

In step S401 of FIG. 13, the controller unit 205 of respective communication apparatuses 1201 and 1202 receives the beacon at a prescribed time. In step S402, the controller unit 205 of respective communication apparatuses 1201 and 1202 analyzes the beacon information.

The controller unit 205 of respective communication apparatuses 1201 and 1202 thereby understands the number of the communication respondents thereof. In step S403, the controller unit 205 of respective communication apparatuses 1201 and 1202 determines whether or not the number of the communication respondents thereof is one unit. It is to be understood that, in the present circumstance, the controller unit 205 of respective communication apparatuses 1201 and 1202 determines the device that transmits the beacon as the communication respondent thereof. At the present point in time, one communication respondent is present, and thus, the determination in step S403 is true, i.e., "YES," whereupon the process proceeds to step S404, wherein the controller unit 205 of the communication apparatuses 1201 and 1202 performs the antenna selection in order to improve the mutual quality of the transmission thereof. The antenna selection process according to the embodiment is similar to the antenna selection process according to the first embodiment, and a description thereof will thus be omitted herein.

Thereafter, the user sets an operating mode for the communication apparatus 1203 to be the ad hoc mode. The user then sets an SSID, together with a security setting, to a predetermined value. Doing so creates a state wherein ad hoc communication is possible.

Thereafter, the communication apparatuses 1201, 1202, and 1203 transmit the notification signal, in accordance with the control of either the media access control (MAC) unit 204 or the controller unit 205 of each communication apparatus.

In step S401 of FIG. 13, the controller unit 205 of each respective communication apparatus 1201, 1202, and 1203 thereby receives the beacon at the prescribed time. Thereafter, in step S402, the controller unit 205 of respective communication apparatuses 1201, 1202, and 1203 analyzes the beacon information thus received.

The controller unit 205 of respective communication apparatuses 1201, 1202, and 1203 thereby understands the number of the communication respondents thereof. In the present circumstance, there are two communication respondent present, and thus, the determination in step S403 is false, i.e., "NO," whereupon the process proceeds to step S404, wherein the controller unit 205 of the communication apparatuses 1201, 1202, and 1203 interrupts the antenna selection, and employs only one prescribed antenna to perform the communication.

The preceding operation facilitates improving the quality of transmission when the number of the communication respondents is one. In addition, the preceding operation also facilitates minimizing the power consumption thereof by employing only one antenna when the number of the communication respondents is two or more.

In addition, it would be permissible to include an information within the beacon that is transmitted that denotes whether the device that is transmitting the beacon is the image input apparatus or the image output apparatus, and to use the information that denotes whether the device that is transmitting the beacon is the image input apparatus or the image output apparatus in performing the antenna selection. In addition, it would also be permissible to include an information within the beacon that is transmitted that denotes either or both of the power supply type of the communication apparatus and the remaining battery life thereof, and to use the information that denotes either or both of the power supply type of the communication apparatus and the remaining battery life thereof in performing the antenna selection. Doing so thereby makes it possible to perform the antenna selection in accordance with the number of the devices, the type of the device, and the power supply information, and to improve an efficiency of a specified device.

According to the embodiments described herein, it is possible to perform an appropriate antenna selection process when a possibility of communicating with a plurality of respondents exists.

The objective of the present invention is also achieved by supplying a recording medium, whereupon is recorded a program code of a software that implements the functions described herein, to either a system or an apparatus, and having a computer of the system or the apparatus load and execute the program code that is stored upon the recording medium. In such a circumstance, the program code itself that is loaded from the recording medium implements the functions according to the embodiments, and the storage medium whereupon the program code is stored configured the present invention. Such devices as a central processing unit (CPU) or a microprocessing unit (MPU) are included as the computer.

It would be possible to use such as a floppy disk, a hard drive, an optical disc, a magneto-optical disk, a CD-ROM, a CD-R, a magnetic tape, a nonvolatile memory card, a ROM, or DVD, as the storage medium for supplying the program code, as an example.

Also included is a circumstance wherein the functions described herein are implemented by having an operating system (OS) or other software that is running upon the computer perform an actual process in whole or in part, in accordance with an instruction of the program code.

Further included is a circumstance wherein the functions described herein are implemented by writing the program code that is loaded from the storage medium to a memory that is upon a function extension board that is built into the computer, or a function extension unit that is connected to the computer, and having a CPU or other hardware that is upon the function extension board or the function extension unit perform the actual process in whole or in part, in accordance with the instruction of the program code.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-165225, filed Jun. 22, 2007, which is hereby incorporated by reference herein in its entirety.

What is claimed is:

1. A communication apparatus comprising:
a Multiple Input Multiple Output (MIMO)-antenna-selection device which selects antennas to be used in MIMO technology communication;
a discrimination device which discriminates a type of another communication apparatus;
a decision device which decides whether or not to execute an antenna selection process for selecting antennas to be used in the MIMO technology communication by the MIMO-antenna-selection device, based on a discrimination result by the discrimination device and a type of the communication apparatus; and
a communication device which communicates with the other communication apparatus using a MIMO technology in ad hoc communication in a case that the decision device decides to execute the antenna selection process, and without using a MIMO technology in ad hoc communication in a case that the decision device decides not to execute the antenna selection process.

2. The apparatus according to claim 1, wherein the discrimination device discriminates the type of the other communication apparatus based on data transmitted from the other communication apparatus.

3. The apparatus according to claim 1, wherein the discrimination device discriminates a function of the other communication apparatus.

4. The apparatus according to claim 1, wherein the discrimination device discriminates a type of power supply of the other communication apparatus.

5. The apparatus according to claim 1, wherein the discrimination device discriminates a remaining battery life of the other communication apparatus.

6. The apparatus according to claim 1, wherein the discrimination device discriminates the type of the communication apparatus.

7. The apparatus according to claim 1, wherein the discrimination device discriminates a function of the communication apparatus and a function of the other communication apparatuses.

8. The apparatus according to claim 1, wherein the discrimination device discriminates a type of power supply of the communication apparatus and a type of power supply of the other communication apparatus.

9. The apparatus according to claim 1, wherein the discrimination device discriminates a remaining battery life of the communication apparatus and a remaining battery life of the other communication apparatus.

10. The apparatus according to claim 1, wherein the discrimination device analyzes information included in received data from the other apparatus to discriminate the type of the other apparatus which is configuring a network.

11. The apparatus according to claim 1, wherein the discrimination device discriminates a number of devices configuring a network.

12. The apparatus according to claim 1, further comprising an instruction device which instructs an ad hoc communication partner to execute the process of selecting the antennas to be used in the MIMO technology communication.

13. The apparatus according to claim 1, further comprising a plurality of antennas, wherein the MIMO-antenna-selection device selects one or more antennas from among the plurality of antennas.

14. A control method of a communication apparatus, comprising:
selecting, by a Multiple Input Multiple Output (MIMO)-antenna-selection device, antennas to be used in MIMO technology communication;
discriminating a type of another communication apparatus;
deciding whether or not to execute an antenna selection process for selecting antennas to be used in the MIMO technology communication by the MIMO-antenna-selection device, based on a discrimination result in the discriminating step and a type of the communication apparatus; and
communicating with the other communication apparatus using a MIMO technology in ad hoc communication in a case that it is decided to execute the antenna selection process in the deciding step, and without using a MIMO technology in ad hoc communication in a case that it is decided not to execute the antenna selection process in the deciding step.

15. A non-transitory computer readable recording medium configured to record the computer program for causing the computer to execute the control method of the communication apparatus according to claim 14.

* * * * *